United States Patent
Ballard

[19]

[11] Patent Number: 6,059,649
[45] Date of Patent: May 9, 2000

[54] RIB SPREADING DEVICE AND METHOD OF UTILIZATION

[76] Inventor: Kenneth Ballard, 5620 N. Burton Rd., Orange, Tex. 77632

[21] Appl. No.: 09/170,708

[22] Filed: Oct. 13, 1998

[51] Int. Cl.$^7$ .......................................................... A22B 5/06
[52] U.S. Cl. ............................................ 452/197; 452/198
[58] Field of Search ...................................... 452/197, 198

[56] References Cited

U.S. PATENT DOCUMENTS

| | | |
|---|---|---|
| 12,222 | 1/1855 | Tesh . |
| 370,615 | 10/1887 | Folger . |
| 1,571,376 | 2/1926 | Rogers . |
| 2,430,996 | 12/1947 | Rush . |
| 2,747,321 | 5/1956 | Thompson . |
| 2,768,768 | 10/1956 | Cornell et al. . |
| 3,144,707 | 8/1964 | Hiestand . |
| 3,197,848 | 8/1965 | Eichacker . |
| 4,240,611 | 12/1980 | Bartlett . |
| 4,901,397 | 2/1990 | Pursell et al. . |
| 5,360,368 | 11/1994 | Hajek . |
| 5,707,281 | 1/1998 | Hicks . |

FOREIGN PATENT DOCUMENTS

| | | | |
|---|---|---|---|
| 14312 | 7/1881 | Germany | ................................ 452/197 |
| 560296 | 9/1932 | Germany | ................................ 452/197 |

*Primary Examiner*—Willis Little
*Attorney, Agent, or Firm*—Royston, Rayzor, Vickery, Novak & Druce, L.L.P.

[57] ABSTRACT

An animal carcass rib spreader and method of use. The rib spreader includes two carcass engaging members coupled to a frame. Each of the carcass engaging members is adapted to engage opposite halves of a rib cage of an animal carcass. A first carcass engaging member of the two carcass engaging members is mounted to a carriage unit. The carriage unit is coupled upon an elongate member of the frame by a mechanically progressive mechanism that is used for causing movement relative to that elongate member. The mechanically progressive mechanism is engaged upon the elongate member and configured for manual actuation. The mechanically progressive mechanism incrementally advances the first carcass engaging member away from a second carcass engaging member for spreading the rib cage of the animal carcass. Preferably, the mechanically progressive mechanism is a ratchet mechanism driven by a pivotable actuator of a handle assembly that is connected to the carriage unit. The handle assembly includes a leverage extension configured to permit a user to manually grasp the leverage extension and the pivotable actuator in one hand thereby facilitating a squeeze action by a user of the handle assembly for mechanically spreading the rib cage of the animal carcass. A release mechanism is associated with the mechanically progressive mechanism for disengaging the mechanically progressive mechanism from locked engagement with the elongate member of the frame. This allows the first carcass engaging member to return toward the second carcass engaging member for disengaging the carcass engaging members from the animal carcass. Preferably, the release mechanism is a depressible lever configured for permitting a user to disengage the mechanically progressive mechanism using the same single hand utilized to actuate the mechanically progressive mechanism.

12 Claims, 2 Drawing Sheets

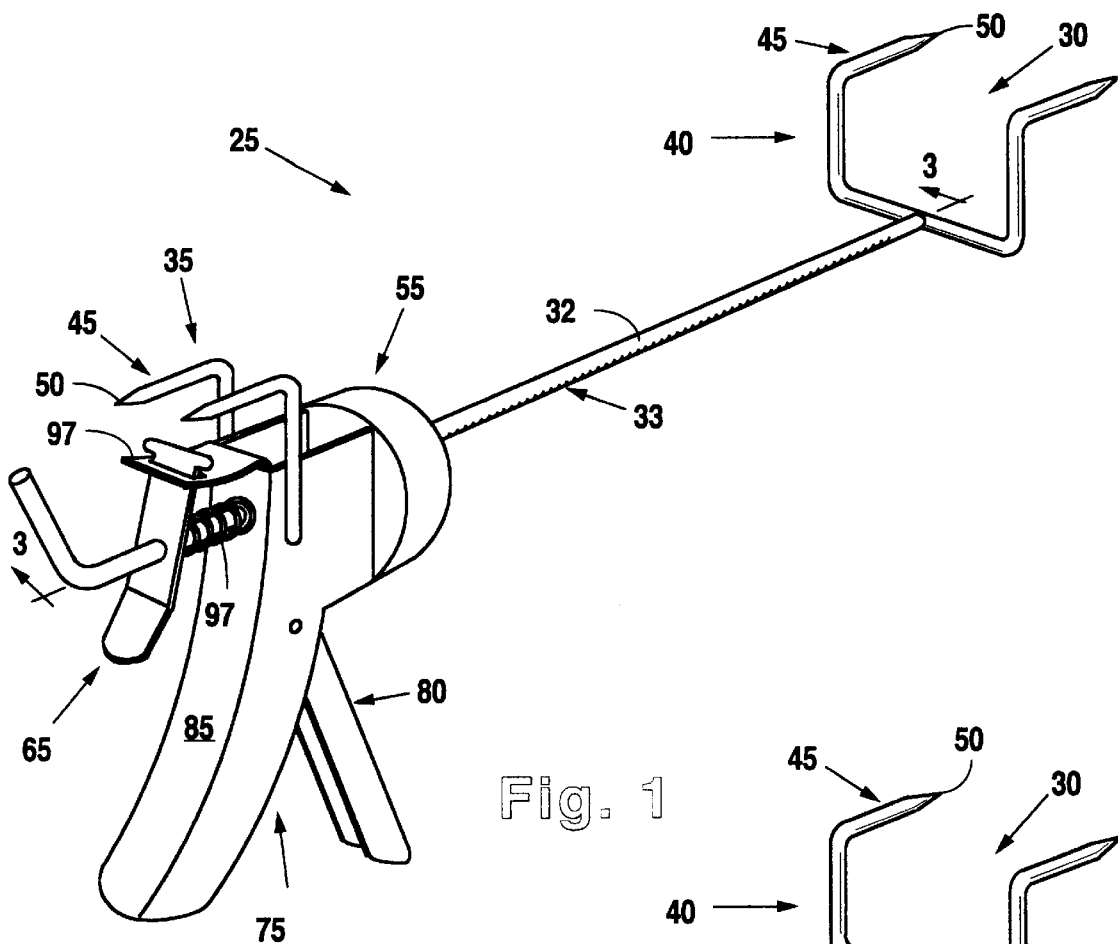
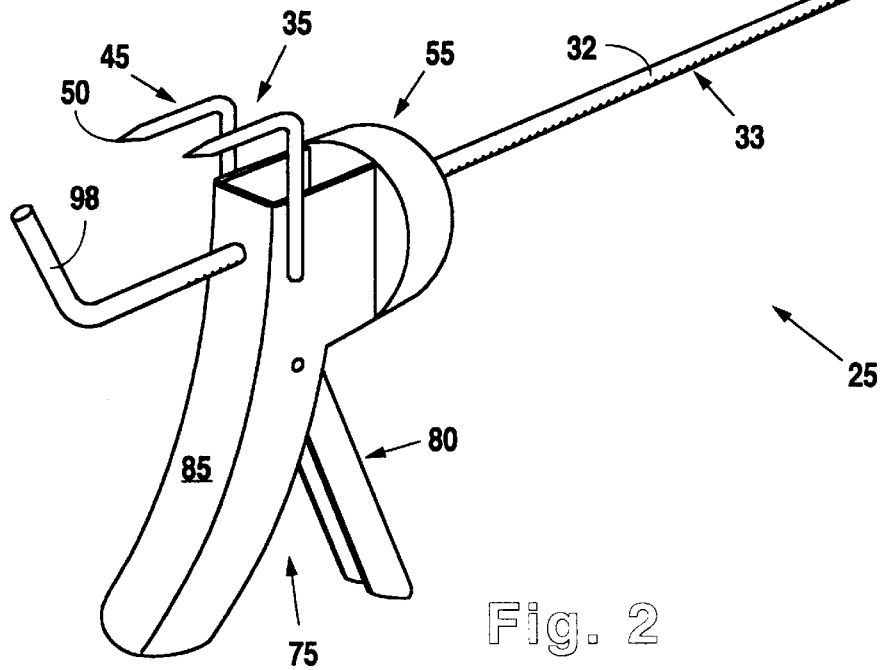

RIB SPREADING DEVICE AND METHOD OF UTILIZATION

DESCRIPTION

1. Technical Field

The present invention relates to equipment used primarily by hunters for field dressing an animal carcass; more particularly, it relates to devices and their methods of use for spreading the rib cage and exposing the thoracic cavity of the animal to be field dressed for disembowelment.

2. Background Art

Rib spreading devices are known in the art, however, several universal deficiencies have been recognized by the inventor of the present invention. One such deficiency is that a suitable mechanism has not been previously developed for oppositely engaging each of the two sides of an animal's rib cage with non-slip members that remain engaged at the points of engagement until specifically removed therefrom.

Another recognized deficiency of previously known rib spreading devices is that two handed operation is normally required. It is not always convenient for a hunter to dedicate both of his or her hands to the rib spreading operation because associated manipulation is often required of either other devices or particular parts of the animal to ensure proper engagement and operation of the device during the rib spreading process.

Still further, none of the previously known rib spreading devices provides a mechanical means for achieving the spreading action. As an example, U.S. Pat. No. 5,707,281 disclosing a Game Carcass Spreader provides a hand hold for the user on a reciprocating component of the spreader. A drawback, however, is that the entire force for spreading the ribs is required to be applied by the user using one hand while holding a second portion of the spreading device or the opposed half of the animal rib cage to accomplish the desired degree of spread. This is unacceptable for two reasons. First, it is often times the case that the animal will be of such a great size that manual spreading of the ribs is not possible. This can also be true on smaller animals which have tight rib cages that do not lend themselves to being spread under the manual force that a hunter can impose. Second, such a device ultimately causes the user to physically grasp the carcass in one or more places which is also typically not desired.

In view of the above described deficiencies associated with the design and use of known game rib spreading devices, the present invention has been developed to alleviate these drawbacks and provide further benefits to the user. These enhancements and benefits are described in greater detail hereinbelow with respect to several alternative embodiments of the present invention.

DISCLOSURE OF THE INVENTION

The present invention in its disclosed embodiments alleviates the drawbacks described above with respect to known game rib spreading devices and their respective methods of operation. These benefits are derived from several primary design features which include engagement members that are configured for non-slipping, non-rotating engagement with the animal carcass, and particularly with lower edge portions of two halves of an animal's rib cage. Another primary beneficial feature is the mechanical mechanism that preferably takes the form of a rachet that can be progressively opened responsive to repeated squeeze actions of the operator on a handle assembly. A spread configuration of the animal is then maintained while the cleaning process of the carcass is conducted and until purposely released and relaxed and disengaged therefrom by the user. Advantageously, this release action is accomplished in at least one embodiment with a depressible lever that can be actuated to disengage the spreading device from the locked configuration. This permits the operator to use the same hand to single handedly release the spreader from the animal carcass while still maintaining a second hand free for other manipulations. Together these two features permit a hunter to more easily field dress an animal carcass single handedly and maintain his or her hands outside and away from the animal cavity for cleanliness and sanitation purposes.

In a preferred embodiment, the present invention takes the form of an animal carcass rib spreader. The rib spreader includes two carcass engaging members coupled to a frame. Each of the carcass engaging members is adapted to engage opposite halves of a rib cage of an animal carcass. A first carcass engaging member of the two carcass engaging members is mounted to a carriage unit. The carriage unit is coupled upon an elongate member of the frame by a mechanically progressive mechanism that is used for causing movement relative to that elongate member. The mechanically progressive mechanism is engaged upon the elongate member and configured for manual actuation which incrementally advances the first carcass engaging member away from a second carcass engaging member for spreading the rib cage of the animal carcass.

The mechanically progressive mechanism is a ratchet mechanism driven by a pivotable actuator of a handle assembly that is connected to the carriage unit.

The handle assembly additionally includes a leverage extension configured to permit a user to manually grasp the leverage extension and the pivotable actuator in one hand thereby facilitating a squeeze action by a user of the handle assembly for mechanically spreading the rib cage of the animal carcass.

A release mechanism is associated with the mechanically progressive mechanism for disengaging the mechanically progressive mechanism from the elongate member of the frame. This allows the first carcass engaging member to return toward the second carcass engaging member for disengaging the carcass engaging members from the animal carcass. In at least one embodiment, the release mechanism is a depressible lever associated with the mechanically progressive mechanism and configured for permitting a user to disengage the mechanically progressive mechanism using the same hand used to actuate the mechanically progressive mechanism. Furthermore, the depressible lever may be spring biased toward a locking configuration that keeps the carcass engaging members spaced apart until intentionally released.

At least one of the carcass engaging members includes a slip-resistant tine configured for slip-resistant engagement upon the animal carcass. Preferably, both carcass engaging members have two spaced apart slip-resistant tines, each at distal ends of hook portions of the engaging members that are inserted under a lower edge of a rib cage half of the animal carcass.

By having the two prongs spaced apart generally on a horizontal plane, pivotation of the carcass on the spreader is resisted, if not prevented.

In a complementary embodiment, the present invention takes the form of a method for spreading the rib cage of an animal carcass including placing an animal carcass rib spreader into the lower portion of an exposed rib cage of an animal carcass. Each of two carcass engaging members are engaged upon opposite halves of the rib cage of the animal carcass. The mechanically progressive mechanism is then manually actuated to incrementally advance a first carcass engaging member of the two carcass engaging members away from a second carcass engaging member of the two carcass engaging members thereby spreading the rib cage of the animal carcass. The spreading action is accomplished by squeezing a pivotable actuator toward a leverage extension of a handle assembly to cause advancement of the first carcass engaging member away from a second carcass engaging member to spread the rib cage of the animal carcass.

After the animal is suitably processed, a release mechanism associated with the mechanically progressive mechanism is actuated thereby allowing the first carcass engaging member to return toward the second carcass engaging member for permitting disengagement of the carcass engaging members from the animal carcass. When it is desired to release the animal carcass rib spreader from the animal carcass, a spring biased depressible lever is pressed to actuate the release mechanism.

Numerous objects and advantages of the present invention will become apparent as the following detailed description of the preferred embodiments are read in conjunction with the drawings which illustrate the same. The specific structures through which these benefits are delivered will be described in detail hereinbelow.

BRIEF DESCRIPTION OF THE DRAWINGS

The invention will now be described in greater detail in the following way of example only and with reference to the attached drawings, in which:

FIG. 1 is a perspective drawing of a preferred embodiment of the rib spreading device according to the present invention having a depressible lever as a release mechanism;

FIG. 2 is a perspective view of an alternative embodiment having a twistable actuated release mechanism;

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Furthermore, elements may be recited as being "coupled"; this terminology's use contemplates elements being connected together in such a way that there may be other components interstitially located between the specified elements, and that the elements so specified may be connected in fixed or movable relation one to the other.

Figure 3:
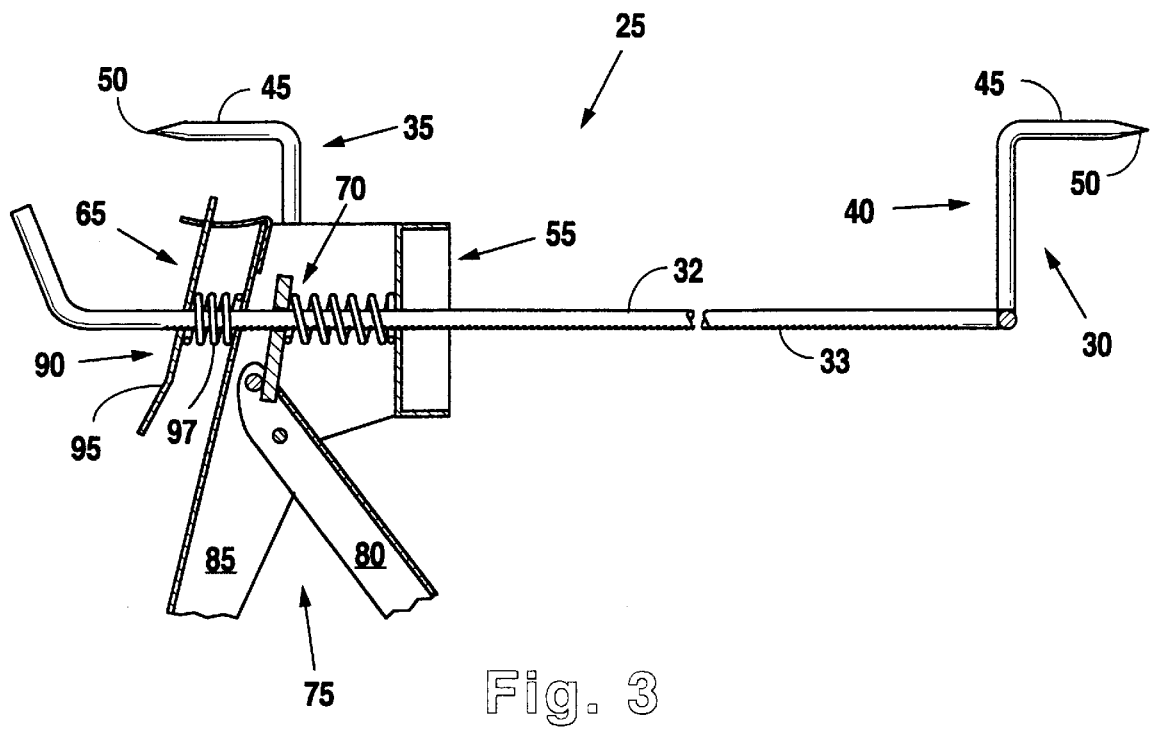
FIG. 3 is a cross-sectional view of the preferred embodiment illustrated in FIG. 1 along a longitudinal centerline.
Figure 4:
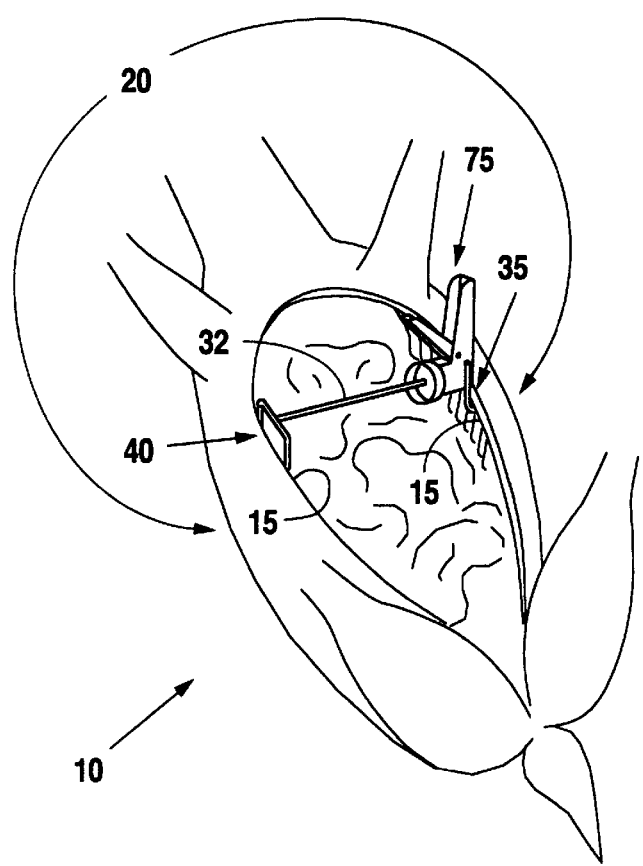
FIG. 4 is a perspective view illustrating the rib spreader's utilization on an animal carcass.

Referring to FIG. 4, a preferred embodiment of an animal carcass rib spreader 25 is illustrated in an installed configuration upon an animal carcass 10 with appropriate portions engaging lower portions 15 of opposite halves 20 of the animal's 10 rib cage.

Referring to FIG. 1, a preferred embodiment of the animal carcass rib spreader 25 is illustrated that is suitably adapted for single handed operation. Therein, a frame 30 is illustrated having an a elongate member 32 shown in a substantially horizontal configuration. The elongate member 32 is substantially cylindrically shaped and includes a series of recesses or notches 33 upon a lower surface thereof for cooperating with a mechanically progressive mechanism 65.

A first carcass engaging member 35 is fixably connected to the frame 30 and a second carcass engaging member 40 is oriented with respect to the frame 30 for translational motion relative thereto. The second translating engagement member 40 is preferably mounted upon a carriage unit 55 capable of sliding movement upon the elongate member 32.

Each of the two carcass engaging members 35, 40 have hook portions 45 designed to be placed underneath the lower rib portions 15 of the opposing halves 20 of the rib cage of the animal carcass 10. In the preferred and illustrated embodiments, each hook portion 45 comprises two slip resistant tines 50, each having a sharpened or pointed tip upon a more generally L-shaped rod.

The mechanically progressive mechanism 65 is preferably provided in the form of a rachet mechanism 70. As is common to such rachet mechanisms 70, a means is provided for progressively increasing the distance between the two engaging members 35, 40 that ultimately engage and spread the halves 20 of the animal carcass' 10 rib cage. The rachetting action is accomplished through a handle assembly 75 having a permanently fixed leverage extension 85 and an associated pivotable actuator 80. The actuator 80 and leverage extension 85 are configured together into the handle assembly 75 and adapted to be easily squeezable single handily by an operator for progressively advancing the second carcass engaging member 40 away from the first carcass engaging member 35. In use, after the rib spreader 25 has been properly installed upon the lower portion 15 of an exposed animal carcass' 10 rib cage, the handle assembly is repeatedly squeezed until the ratchet mechanism 70 causes the proper degree of spread between the opposite halves 20 of the rib cage. After the field dressing process has been completed with respect to the animal's thoracic cavity, relaxation or release of the two engaging members 35, 40 is initiated. This permits the engaging members 35, 40 to collapse back toward one another so that the rib spreader 25 can be disengaged from the animal.

One method and structure by which release can be achieved of the racheted apart members 35,40 is a design of the elongate member 32 whereby a twisting or rotating action of a twistable handle 98 about a longitudinal centerline thereof disengages the recess 33 upon a lower portion of the elongate member 32 from a pawl portion of the rachet mechanism 70. Alternatively and preferably, a release mechanism 90 takes the form of a depressible lever 95 that is biased by a spring 97 toward a locking position. Upon being depressed by the operator, the engaging portion or pawl portion of the lever 95 disengages from the locking recesses 33 of the elongate member 32 permitting the first and second carcass engaging members 35, 40 to collapse towards one another. Advantageously, this depressible lever 95 is oriented upon the handle assembly 75 for accommodating single handed push button style operation by the operator.

Though unique in design and operation, those skilled in the art will recognize several of the component portions of the present invention from conventionally designed caulk dispensing devices. Of the several constituent components of the animal carcass spreader 25, the frame 30, including the elongate member 32 is easily obtainable from such commercially available caulk dispensing devices. Still further, the mechanically progressive mechanism 65, particularly in the racheted embodiment 70, cross utilizes components from the caulk dispensing technologies. Still further, the release mechanisms 90 are also readily recognized from a construction perspective from previously known caulk dispensing devices. This cross-utilization facilitates the inexpensive manufacture of the presently known invention, however, the modify structure and described utilization as an animal carcass rib spreader 25 have heretofore been unknown and not appreciated by previous inventors.

It will be seen, therefore, that the animal carcass rib spreader 25 of the present invention is well adapted to carry out the ends and advantageous mentioned, as well as those inherent therein. While presently preferred embodiments of the apparatus have been described for the purposes of this disclosure, numerous changes in the arrangements and construction of parts may be made by those skilled in the art. All such changes are encompassed within the scope and spirit of the appended claims.

Industrial Applicability

The present invention finds applicability in the hunting equipment manufacturing industries, and particularly with respect to equipment and devices used for field dressing game.

What is claimed and desired to be secured by Letters Patent is as follows:

1. An animal carcass rib spreader comprising:
   a frame having two carcass engaging members coupled thereto, each of said carcass engaging members being adapted to engage opposite halves of a rib cage of an animal carcass;
   a first carcass engaging member of said two carcass engaging members being mounted to a carriage unit, said carriage unit coupled upon an elongate member of said frame by a mechanically progressive mechanism for causing movement relative thereto;
   said mechanically progressive mechanism engaged upon said elongate member and configured for manual actuation that incrementally advances said first carcass engaging member away from a second carcass engaging member of said two carcass engaging members for spreading the rib cage of an animal carcass; and
   a release mechanism associated with said mechanically progressive mechanism for disengaging said mechanically progressive mechanism from said elongate member of said frame thereby allowing said first carcass engaging member to return toward said second carcass engaging member for disengaging said carcass engaging members from an animal carcass.

2. The animal carcass rib spreader as recited in claim 1; wherein said mechanically progressive mechanism is a ratchet mechanism driven by a pivotable actuator of a handle assembly connected upon said carriage unit.

3. The animal carcass rib spreader as recited in claim 2; wherein said handle assembly further comprises a leverage extension configured to permit a user to manually grasp said leverage extension and said pivotable actuator in one hand thereby facilitating a squeeze action by a user of the handle assembly for mechanically spreading the rib cage of an animal carcass.

4. The animal carcass rib spreader as recited in claim 1, wherein said release mechanism is a depressible lever associated with said mechanically progressive mechanism and configured for permitting a user to disengage said mechanically progressive mechanism using the same hand used to actuate said mechanically progressive mechanism.

5. The animal carcass rib spreader as recited in claim 4, wherein said depressible lever is spring biased toward a locking configuration.

6. The animal carcass rib spreader as recited in claim 1, wherein at least one of said carcass engaging members includes at least one slip-resistant tine configured for slip-resistant engagement upon an animal carcass.

7. The animal carcass rib spreader as recited in claim 1, wherein each of said carcass engaging members includes at least one slip-resistant tine configured for slip-resistant engagement with an animal carcass.

8. The animal carcass rib spreader as recited in claim 1, wherein each of said carcass engaging members includes at least two slip-resistant tines configured for slip-resistant engagement with an animal carcass.

9. The animal carcass rib spreader as recited in claim 1, wherein at least one of said carcass engaging members includes a hook portion for insertion under a lower edge of a rib cage half of an animal carcass.

10. A method for spreading the rib cage of an animal carcass comprising:
    placing an animal carcass rib spreader into the lower portion of an exposed rib cage of an animal carcass;
    engaging each of two carcass engaging members upon opposite halves of the rig cage of the animal carcass;
    manually actuating a mechanically progressive mechanism that incrementally advances a first carcass engaging member of said two carcass engaging members away from a second carcass engaging member of said two carcass engaging members thereby spreading the rib cage of the animal carcass; and
    actuating a release mechanism associated with said mechanically progressive mechanism thereby allowing said first carcass engaging member to return toward said second carcass engaging member for permitting disengagement of said carcass engaging members from the animal carcass.

11. The method for spreading the rib cage of an animal carcass as recited in claim 10, further comprising:
    squeezing a pivotable actuator toward a leverage extension of a handle assembly to cause advancement of said first carcass engaging member away from a second carcass engaging member to spread the rib cage of the animal carcass.

12. The method for spreading the rib cage of an animal carcass as recited in claim 10, further comprising:
    depressing a spring biased depressible lever to actuate said release mechanism.

* * * * *